Dec. 8, 1953     G. M. STEVENSON ET AL     2,661,894
BLOWER WHEEL AND SUPPORTING AND DRIVING MEANS THEREFOR
Filed May 31, 1951
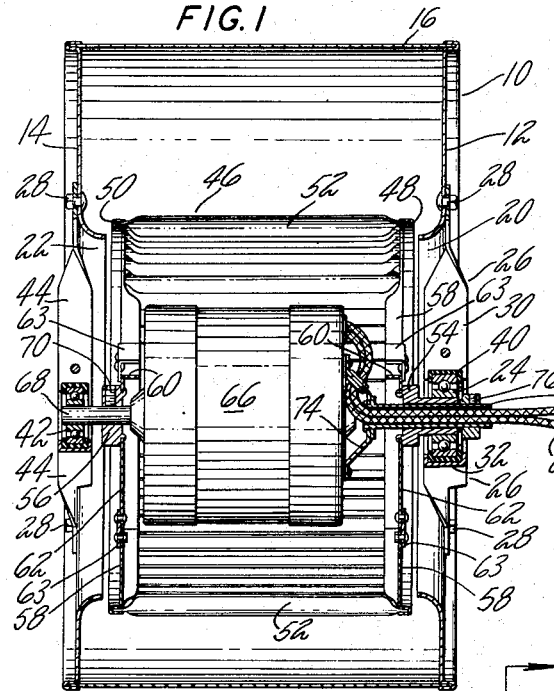
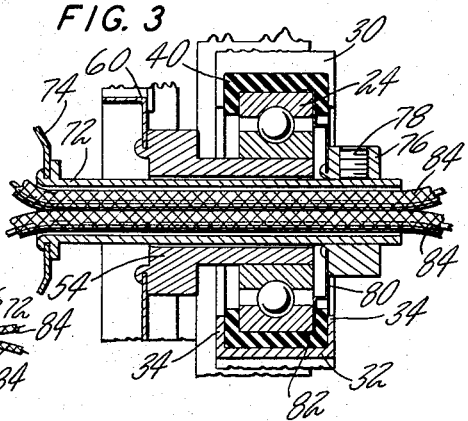
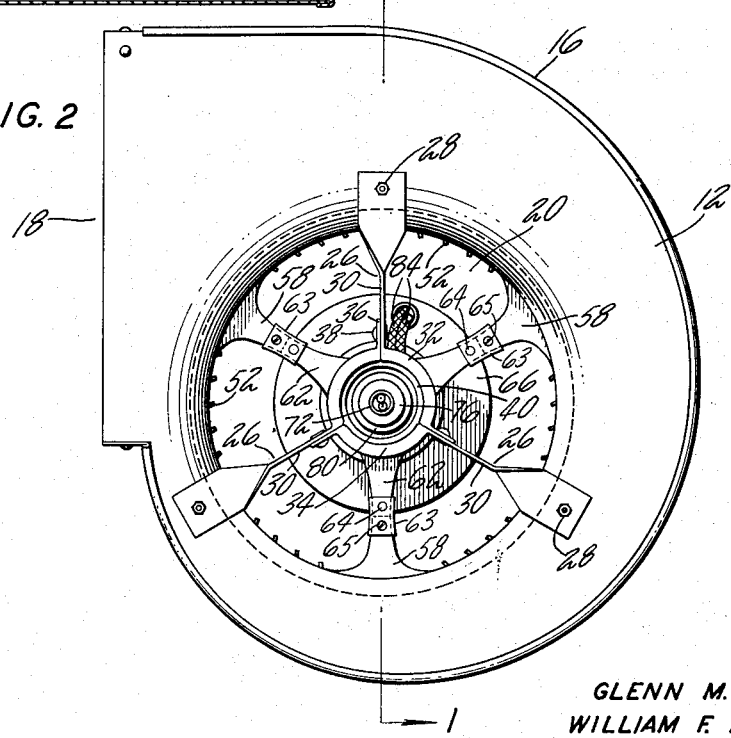
INVENTORS
GLENN M. STEVENSON
WILLIAM F. McFARLANE
BY S. Jay Teller
ATTORNEY Patented Dec. 8, 1953

2,661,894

UNITED STATES PATENT OFFICE 2,661,894

BLOWER WHEEL AND SUPPORTING AND DRIVING MEANS THEREFOR

Glenn M. Stevenson, Long Beach, and William F. McFarlane, Maywood, Calif., assignors to The Torrington Manufacturing Company—Western Division, Los Angeles, Calif., a corporation of California Application May 31, 1951, Serial No. 229,116

12 Claims. (Cl. 230—117)

The invention relates to a blower wheel and supporting and driving means therefor.

The principal object of the invention is to provide a construction wherein the blower wheel is driven or adapted to be driven by a motor which is entirely enclosed within the blower wheel. This arrangement conserves space, provides more effective cooling of the motor, and has other advantages.

Another object of the invention is to provide a construction of the type mentioned wherein provision is made for readily assembling the motor and the blower wheel and for readily disassembling them.

More specific objects of the invention are to provide various features of construction and arrangement of parts whereby the before-mentioned more general objects are attained.

In the drawing we have shown in detail a preferred embodiment of the invention, but it will be understood that various changes may be made from the construction shown and that the drawing is not to be construed as defining or limiting the scope of the invention, the claims forming a part of this specification being relied upon for that purpose.

Of the drawing:

Fig. 1 is a vertical longitudinal sectional view taken along the line 1—1 of Fig. 2 and showing a blower wheel and a housing and motor therefor embodying the invention.

Fig. 2 is a right end view.

Fig. 3 is an enlarged fragmentary sectional view similar to a portion of Fig. 1.

A main support is provided and preferably the blower wheel and the motor are enclosed within a suitable housing 10 which constitutes the said main support. As shown in the drawing, the housing 10 is of the volute type. The housing 10 is shown as having parallel sheet metal end walls 12 and 14 and as having a volute sheet metal peripheral wall 16 which terminates in a large discharge opening at 18. The end walls 12 and 14 are provided respectively with large circular oppositely disposed intake openings 20 and 22.

For partly supporting the rotatable blower wheel at one end and specifically at the right end, a bearing 24 is provided, this bearing preferably being a ball bearing. The bearing 24 is normally supported in a fixed position. When an enclosing housing such as 10 is provided, the bearing 24 is located in the corresponding housing opening 20 at or near the center thereof. The bearing 24 is preferably supported on the corresponding housing end wall 12. The means for supporting the bearing 24 is preferably so constructed that the bearing is readily detachable and removable. When removed, the intake opening in the housing end wall is exposed.

The said supporting means may be widely varied, but the presently preferred supporting means includes substantially equally spaced radial sheet metal arms 26, 26, three such arms being shown. The outer end of each arm is parallel to the end wall 12 and is in engagement therewith, being detachably held by a bolt having a nut 28. Each arm 26 is twisted adjacent its outer end so that its intermediate portion 30 is perpendicular to the wall 14. The inner end portion of each arm 26 is cylindrically bent as shown at 32 to extend along a third of the periphery of the outer race of the bearing. The cylindrically bent portion has inwardly extending flanges 34, 34 at its edges. At the end of the cylindrically bent portion 32 there is an outwardly extending portion 36 which engages the intermediate portion 30 of the next adjacent arm. Each portion 36 is connected by a rivet 38 with the corresponding portion 30. The three cylindrically bent portions 32, 32 constitute a flanged ring which surrounds the outer race of the bearing. Rubber collars 40, 40 are preferably interposed between the said ring and the said outer bearing race, the said collars serving to support the bearing in a fixed position. There is ample space between the arms 26, 26 for the entry of air through the intake opening 20 and into the housing 10. By reason of their described twisting, the arms offer a minimum of obstruction to the passage of air.

The bearing 24 and the supporting means therefor are detachably connected with the housing end wall by means of the nuts 28, 28, and the said bearing and supporting means may be readily detached and removed by removing the nuts, the corresponding intake opening being thus exposed.

For partly supporting the rotatable blower wheel at the other end, specifically at the left end, a bearing 42 is provided, this bearing also preferably being a ball bearing. The bearing 42 is normally supported in a fixed position with its axis in alignment with the axis of the bearing 24. The bearing 42 is preferably somewhat smaller than the bearing 24. When an enclosing housing such as 10 is provided, the bearing 42 is located in the corresponding housing opening 22 at or near the center thereof. The bearing 42 is preferably detachably supported on the corresponding housing end wall 14.

The means for supporting the bearing 42 may be widely varied, but the presently preferred supporting means for the bearing includes three equally spaced radial sheet metal arms 44, 44. The details of the supporting means for the bearing 42 are or may be similar to those of the supporting means for the bearing 24.

A blower wheel 46 is positioned between the bearings 24 and 42 with its axis in alignment with the axes of the said bearings. When a housing such as 10 is provided, the blower wheel is within the housing and between the planes of the housing end walls 12 and 14. The blower wheel may be assembled through the housing discharge opening 18. The blower wheel comprises sheet metal end rings 48 and 50 which carry an annular series of longitudinal sheet metal blades 52, 52. The shape of the blades and their manner of connection with the end rings may be in accordance with conventional practice.

The blower wheel has central hubs 54 and 56 at the right and left ends thereof, to which the end rings 48 and 50 are respectively connected. Preferably the connecting means between one of the rings and the corresponding hub is such that the hub may be readily disconnected from the ring for a purpose to be explained. The two connecting means for the two hubs are preferably, but not necessarily, the same in construction. The said connecting means between the rings and the hubs may be widely varied, but the presently preferred connecting means will be described in detail, reference being made particularly to the connecting means at the right.

The end ring 48 is provided with a plurality of equally spaced inwardly extending spoke elements 58, 58, three such elements being shown. The spoke elements 58, 58 are preferably U-shaped in cross section. It will be observed that a large exposed central opening is provided within the end ring and between the inner ends of the spoke elements 58, 58. A sheet metal disc 60 is connected with the hub 54, the said disc being provided with a plurality of outwardly extending spoke elements 62, 62 which may be aligned with the spoke elements 58, 58 on the end ring 48. The spoke elements 62, 62 are preferably also U-shaped in cross section. Each two aligned spoke elements are connected with each other by a clip 63. Each clip 63 is or may be permanently connected to the corresponding hub spoke element 62, as for instance by a rivet 64. Each clip 63 is detachably connected to the corresponding ring spoke element 58, as for instance by a screw 65. The said spoke elements 58, 58 and 62, 62, together with the clips 63, constitute radial spokes for connecting the right end ring 48 with the hub 54. There is ample space between the spokes for the entry of air into the blower wheel.

It will be seen that, by reason of the disclosed detachable spoke construction, each hub with its spoke elements 58, 58 and with the clips 63, 63 can be detached from the blower wheel and moved axially away therefrom, thus exposing the beforementioned large opening within the ring. The reason for the detachability of the hub and its connected parts and for the exposure of the said opening is hereinafter explained.

The right hub 54 is provided with an extension at the right thereof which engages with and is rotatably supported by the inner race of the right bearing 24. The said hub has a relatively large central opening therein.

An electric motor 66 is positioned or adapted to be positioned within the blower wheel 46 with its axis coincident with the axis of the blower wheel and coincident with the axes of the bearings 24 and 42. The motor has a nonrotary external frame and an internal rotor with which is connected a rotary drive shaft 68. The said drive shaft projects at the left, this shaft extending through and fitting the left blower wheel hub 56 and being engaged with the inner race of the left ball bearing 42. The shaft 68 by reason of its engagement with the bearing 42 serves to support the motor at the left end thereof. The hub 56 is connected with the shaft 68 by a set screw 70. The shaft 68 and the bearing 42 support the blower wheel at the left end thereof and the shaft serves to drive the said blower wheel. As previously stated, the bearing 24 supports the blower wheel at the right end thereof.

For supporting the motor at the right end thereof, there is provided a nonrotary support 72 which is rigidly connected with the motor and which extends through the opening in the hub 54. As shown, the support 72 is rigidly connected with a bracket 74 secured to the frame of the motor at the right end thereof. Inasmuch as the support 72 is nonrotatable, the hub 54 rotates around it.

A device is provided which engages the support 72 to prevent rotation thereof. As shown, a collar 76 is secured by means of a set screw 78 to the end portion of the support at the right of the hub 54 and at the right of the bearing 24. Connected with the collar is a sheet metal disc 80 which is connected with the support for the bearing 24. Preferably, the disc 80 has an annular inwardly extending flange 82 which engages the outer race of the ball bearing 20 and is interposed between the said race and the outer rubber collar 40.

There is preferably a clearance between the support 72 and the hub 54 so that they are free from engagement with each other. When such a clearance is provided, the disc 80 and the collar 76 collectively constitute a carrier which serves not only to prevent rotation of the support 72 but also hold it in fixed position. Thus the carrier in cooperation with the support 72 serves to support the right end of the motor and to prevent rotation thereof.

Preferably, the motor support 72 is hollow or tubular. Electrical connection wires 84, 84 for the motor extend through the hollow nonrotary support or tube 72 and through an aperture in the nonrotary bracket 74 which is connected with the motor frame.

When the blower wheel is in operation and is located within a housing such as 10, it serves to draw air into the housing through the oppositely disposed intake openings 20 and 22 and to discharge the air through the discharge opening 18. The twisted sheet metal supporting arms 26, 26 for the bearings obstruct the entry of air to only a minimum extent. The air enters the blower wheel at the opposite ends thereof, there being ample space between the radial spokes for the entry of the air. The motor 66 is located entirely within the blower wheel and by reason of the described construction the motor is held in fixed position and serves to drive the blower wheel, current for the motor being supplied by wires extending through the hollow motor support 72. The location of the motor within the blower wheel saves the space which is required when the motor is conventionally located outside of the blower wheel and outside of the housing. Furthermore, the air passing through the blower wheel and around the motor serves to effectively cool the said motor.

During assembly, the motor is longitudinally inserted into the blower wheel at one end thereof and it will be assumed that it is so inserted at the right end. The motor is so inserted prior to the connection to the blower wheel of the right hub 54 and prior to the connection to the housing end wall 12 of the supporting means for the right bearing 24. It will be observed that the before-mentioned exposed opening between the inner ends of the ring spoke elements 58, 58 has a diameter larger than the diameter of the motor, ample space being thus available for the insertion of the motor. As the motor is inserted the shaft 68 thereof is moved through the hub 56 and into the bearing 42. It will be understood that when the motor is inserted as above-described, the bearing 24 and its supporting means are not in place, the motor being also inserted through the exposed space which is available when the said bearing and its supporting means have been removed.

With the motor fully inserted, the hub 54 is put in place with the motor support 72 extending through it and the hub is connected to the blower wheel by means of the screws 65, 65. Then the bearing 24 is put in place to engage the hub 54 and the supporting means for the said bearing is connected with the end wall 12 by means of the nuts 28, 28. Alternatively, the hub 54 and the bearing 24 with its supporting means may be initially assembled with the motor support 72 so that all of the parts are moved simultaneously into their proper positions as the motor is inserted.

In the foregoing description it has been assumed that the motor is inserted at the right, but it will be apparent that it could be similarly inserted at the left. Assembly at the right is preferred, as the connection wires 84, 84 would present a troublesome problem with assembly at the left.

When disassembly is required for servicing the motor or for any other purpose, the described steps for assembly are reversed.

For convenience of description, various parts are sometimes herein referred to and distinguished by the terms "right" and "left." It will be understood that the said terms are not used in a restrictive sense and that the construction as shown and described may be reversed without departing from the invention.

The invention claimed is:

1. In combination, two longitudinally spaced axially aligned bearings, means for supporting the bearings in normally fixed relationship with each other, a blower wheel located between the bearings and having centrally apertured hubs at opposite ends thereof, the blower wheel hub at one end being engaged with and rotatably supported by the corresponding adjacent bearing, an electric motor located within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the said shaft to enable the shaft to drive the blower wheel, and a nonrotary motor support rigidly connected with the nonrotary external motor frame at the end thereof opposite the said projecting shaft and extending through the said bearing engaging hub of the blower wheel.

2. In combination, two longitudinally spaced axially aligned bearings, means for supporting the bearings in normally fixed relationship with each other, a blower wheel located between the bearings and having centrally apertured hubs at opposite ends thereof, the blower wheel hub at one end being engaged with and rotatably supported by the corresponding adjacent bearing, an electric motor located within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the said shaft to enable the shaft to drive the blower wheel, a hollow nonrotary motor support rigidly connected with the nonrotary external motor frame at the end thereof opposite the said projecting shaft and extending through the said bearing engaging hub of the blower wheel, and electrical connection wires for the motor extending through the hollow nonrotary motor support.

3. In combination, two longitudinally spaced axially aligned bearings, means for supporting the bearings in normally fixed relationship with each other, a blower wheel located between the bearings and having centrally apertured hubs at opposite ends thereof, the blower wheel hub at one end being engaged with and rotatably supported by the corresponding adjacent bearing, an electric motor located within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the said shaft to enable the shaft to drive the blower wheel, a nonrotary motor support rigidly connected with the nonrotary external motor frame at the end thereof opposite the said projecting shaft and extending through the said bearing engaging hub of the blower wheel and free from engagement with the said hub, and a carrier engaging the said support adjacent the outer end of the last said hub which carrier holds the support in fixed position and prevents rotation thereof and thus prevents rotation of the motor frame.

4. In combination, a housing having end walls with oppositely disposed intake openings therein, two bearings supported in normally fixed positions at the centers of the respective intake openings, a blower wheel within the housing and between the bearings which blower wheel has centrally apertured hubs at opposite ends thereof, the blower wheel hub at one end being engaged with and rotatably supported by the corresponding adjacent bearing, an electric motor located within the housing and within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the said shaft to enable the shaft to drive the blower wheel, and a nonrotary motor support rigidly connected with the nonrotary external motor frame at the end thereof opposite the said projecting shaft and extending through the said bearing engaging hub of the blower wheel.

5. In combination, a housing having end walls with oppositely disposed intake openings therein, two bearings supported in normally fixed positions at the centers of the respective intake openings, a blower wheel within the housing and between the bearings which blower wheel has centrally apertured hubs at opposite ends thereof, the blower wheel hub at one end being engaged with and rotatably supported by the corresponding adjacent bearing, an electric motor located within the housing and within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the said shaft to enable the shaft to drive the blower wheel, a hollow nonrotary motor support rigidly connected with the nonrotary external motor frame at the end thereof opposite the said projecting shaft and extending through the said bearing engaging hub of the blower wheel, and electrical connection wires for the motor extending through the hollow nonrotary motor support.

6. In combination, a housing having end walls with oppositely disposed intake openings therein, two bearings supported in normally fixed positions at the centers of the respective intake openings, a blower wheel within the housing and between the bearings which blower wheel has centrally apertured hubs at opposite ends thereof, the blower wheel hub at one end being engaged with and rotatably supported by the corresponding adjacent bearing, an electric motor located within the housing and within the blower wheel and comprising a nonrotary external frame and also comprising a rotary central drive shaft which projects at the end of the motor opposite the last said hub and which extends through the other hub and engages the corresponding adjacent bearing, the said shaft by reason it its engagement with the last said bearing serving to support the motor at the corresponding end thereof and also serving to support the last said blower wheel hub, means for connecting the last said hub with the said shaft to enable the shaft to drive the blower wheel, a nonrotary motor support rigidly connected with the nonrotary external motor frame at the end thereof opposite the said projecting shaft and extending through the said bearing engaging hub of the blower wheel and free from engagement with the said hub, and a carrier engaging the said support adjacent the outer end of the last said hub which carrier holds the support in fixed position and prevents rotation thereof and thus prevents rotation of the motor frame.

7. In combination, a housing having end walls with oppositely disposed intake openings therein, two bearings located respectively at the centers of the said intake openings, means connected with the respective housing end walls for supporting the bearings, a blower wheel within the housing and between the bearings which blower wheel has centrally apertured hubs at opposite ends thereof, the blower wheel hub at one end being engaged with and rotatably supported by the corresponding adjacent bearing, an electric motor located within the housing and within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the said shaft to enable the shaft to drive the blower wheel, a motor support rigidly connected with the nonrotary external motor frame at the end thereof opposite the said projecting shaft and extending through the said bearing engaging the hub of the blower wheel, and a device connected with the said motor support and with the supporting means for the adjacent bearing for preventing rotation of the said support and for thus preventing rotation of the motor frame.

8. In combination, a housing having end walls with oppositely disposed intake openings therein, two bearings located respectively at the centers of the said intake openings, means connected with the respective housing end walls for supporting the bearings, a blower wheel within the housing and between the bearings which blower wheel has centrally apertured hubs at opposite ends thereof, the blower wheel hub at one end being engaged with and rotatably supported by the corresponding adjacent bearing, an electric motor located within the housing and within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the shaft to enable the shaft to drive the blower wheel, a motor support rigidly connected with the nonrotary external motor frame at the end thereof opposite the said projecting shaft and extending through the said bearing engaging the hub of the blower wheel and free from engagement with the said hub, and a carrier connected with the said motor support and with the supporting means for the adjacent bearing for holding the motor support in fixed position and for preventing rotation thereof.

9. In combination, a housing having end walls with oppositely disposed intake openings therein, two bearings located respectively at the centers of the said intake openings, means connected with the respective housing end walls for supporting the bearings, a blower wheel within the housing and between the bearings which blower wheel has centrally apertured hubs at opposite ends thereof, the blower wheel hub at one end being engaged with and rotatably supported by the corresponding adjacent bearing, an electric motor located within the housing and within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the said shaft to enable the shaft to drive the blower wheel, a hollow motor support rigidly connected with the nonrotary external motor frame at the end thereof opposite the said projecting shaft and extending through the said bearing engaging the hub of the blower wheel and free from engagement with the said hub, a carrier connected with the said motor support and with the supporting means for the adjacent bearing for holding the motor support in fixed position and for preventing rotation thereof, and electrical connection wires for the motor extending through the hollow nonrotary motor support.

10. In combination, a housing having end walls with oppositely disposed intake openings therein, two bearings located respectively at the centers of the said intake openings, a plurality of radial sheet metal arms connected with the respective housing end walls for supporting the bearings, each arm having an outer portion parallel with the corresponding end wall and engaged therewith and each arm being twisted to provide an intermediate portion perpendicular to the corresponding end wall, a blower wheel within the housing and between the bearings which blower wheel has centrally apertured hubs at opposite ends thereof, the blower wheel hub at one end being engaged with and rotatably supported by the corresponding adjacent bearing, an electric motor located within the housing and within the blower wheel and comprising a nonrotary external frame and also comprising a rotary central drive shaft which projects at the end of the motor opposite the last said hub and which extends through the other hub and engages the corresponding adjacent bearing, the said shaft by reason of its engagement with the last said bearing serving to support the motor at the corresponding end thereof and also serving to support the last said blower wheel hub, means for connecting the last said hub with the said shaft to enable the shaft to drive the blower wheel, and a nonrotary motor support rigidly connected with the nonrotary external motor frame at the end thereof opposite the said projecting shaft and extending through the said bearing engaging the hub of the blower wheel.

11. In combination, two longitudinally spaced axially aligned right and left bearings, a main support adjacent the bearings and having a portion widely spaced radially from the said right bearing, two means for connecting the respective bearings with the main support which supporting means for the right bearing is detachably connectible with the said widely spaced portion of the main support so that upon removal a large exposed opening is provided between the said widely spaced portions of the main support, a blower wheel normally located between the bearings and comprising two longitudinally spaced right and left end rings which right ring has a large central opening therein, the said blower wheel also comprising two longitudinally spaced centrally apertured right and left hubs connected with the respective end rings which right hub is detachably connectible with the right ring so that upon removal the said opening in the said right ring is exposed, one of the said hubs being normally engaged with and supported by the corresponding adjacent bearing, an electric motor normally located within the blower wheel and of such size that it can be inserted longitudinally therein or withdrawn therefrom through the said exposed openings when the said right bearing and the said right hub are removed, the said motor comprising a nonrotary external frame and also comprising a rotary central drive shaft projecting at the end of the motor opposite the said bearing engaging hub and extending through the other hub and engaging the corresponding adjacent bearing which shaft by reason of its engagement with the last said bearing serves to support the motor at the corresponding end thereof and also serves to support the last said blower wheel hub, means for connecting the last said hub with the said shaft to enable the shaft to drive the blower wheel, and a nonrotary motor support rigidly connected with the nonrotary external motor frame at the end thereof opposite the said projecting shaft and extending through the said bearing engaging hub of the blower wheel.

12. In combination, a housing having end walls with oppositely disposed intake openings therein, right and left bearings normally located respectively at the centers of the said intake openings, two means connected with the respective housing end walls for supporting the bearings which supporting means for the said right bearing is detachably connectible with the corresponding end wall so that upon removal the corresponding intake opening is exposed, a blower wheel normally located within the housing and between the bearings and comprising two longitudinally spaced right and left end rings which said right ring has a large central opening therein, the said blower wheel also comprising two longitudinally spaced centrally apertured right and left hubs connected with the respective end rings which said right hub is detachably connectible with the said right ring so that upon removal the said opening in the said ring is exposed, one of the said hubs being normally engaged with and supported by the corresponding adjacent bearing, an electric motor normally located within the blower wheel and of such size that it can be inserted longitudinally therein or withdrawn therefrom through the said exposed intake openings and the said exposed end ring opening when the said right bearing and the said right hub are removed, the said motor comprising a nonrotary external frame and also comprising a rotary central drive shaft projecting at the end of the motor opposite the said bearing engaging hub and extending through the other hub and engaging the corresponding adjacent bearing which shaft by reason of its engagement with the last said bearing serves to support the motor at the corresponding end thereof and also serves to support the last said blower wheel hub, means for connecting the last said hub with the said shaft to enable the shaft to drive the blower wheel, and a nonrotary motor support rigidly connected with the nonrotary external motor frame at the end thereof opposite the said projecting shaft and extending through the said bearing engaging hub of the blower wheel.

GLENN M. STEVENSON.
WILLIAM F. McFARLANE.

References Cited in the file of this patent

UNITED STATES PATENTS

| Number | Name | Date |
| --- | --- | --- |
| 2,285,799 | Best | June 9, 1942 |